Aug. 25, 1959 S. F. KAPFF 2,901,329
COMBUSTIBLES DETECTOR FOR GAS CHROMATOGRAPHY
Filed Sept. 24, 1957
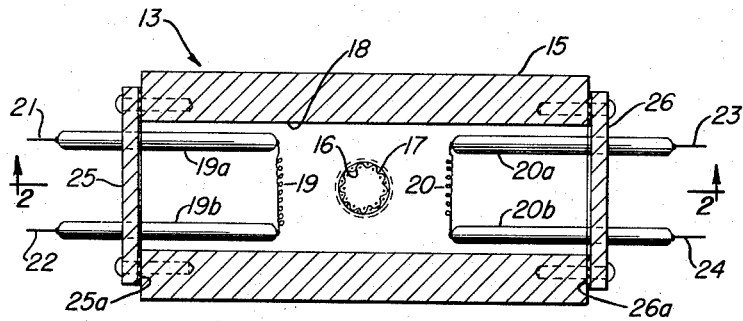
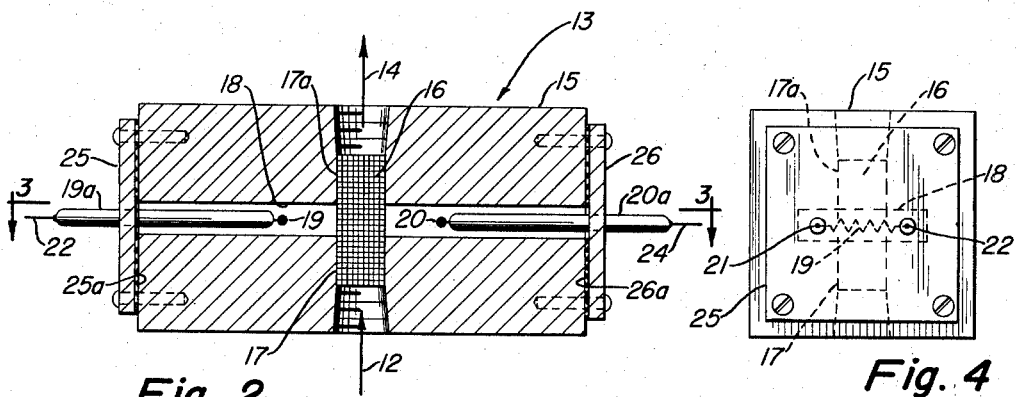
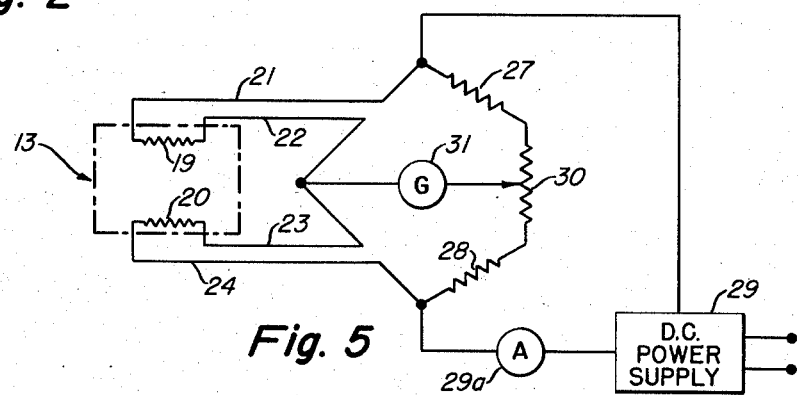
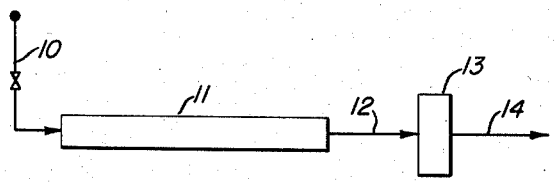
INVENTOR.
Sixt Frederick Kapff
BY
Everett A. Johnson
ATTORNEY

United States Patent Office 2,901,329
Patented Aug. 25, 1959

2,901,329

COMBUSTIBLES DETECTOR FOR GAS CHROMATOGRAPHY

Sixt Frederick Kapff, Homewood, Ill., assignor to Standard Oil Company, Chicago, Ill., a corporation of Indiana Application September 24, 1957, Serial No. 685,846

5 Claims. (Cl. 23—255)

This invention relates to method and means for the analyses of gases for trace amounts of total combustibles. More particularly the invention relates to a system for making such analyses as an adjunct to gas chromatography.

Vapor phase or gas chromatography is an analytical system that gives rapid and accurate analyses of complex mixtures of volatile materials in simple and inexpensive equipment. Separations take place in small columns packed with a specific type of contacting material selected to accomplish particular separations. A few microliters of sample can be analyzed in a relatively short time and the technique is applicable to samples ranging from fixed gases to those that must be distilled at low pressure.

Components of a sample are separated as they are carried through the packed column by an eluting gas and the components are determined by a sensitive detector as they pass from the column.

Vapor phase chromatography is of two general types: adsorption, in which active adsorbents are used as column packing, and partition, in which the packing comprises a stationary liquid phase coating on a finely divided inert solid such as Celite. The liquid amounting to about 40 weight percent of the solid packing is distributed as a thin film which provides a large surface for the gas to contact. The separation in partition chromatography results from differences in vapor pressure of the components of a sample over the stationary liquid.

Variables that affect separation in partition chromatography include column length, flow rate of the eluting gas, temperature of the column, and the chemical nature of the stationary liquid phase. A flow rate of eluting gas is selected to give an adequate separation in a reasonable length of time. The usual range being 20 to 75 ml. per minute and a flow rate of about 20 ml. per minute or more is preferred. The lower rates are useful for improving difficult separations because of the increased contact time in the column. An analysis usually requires 20 to 60 minutes. Nitrogen, helium, hydrogen, and carbon dioxide are common eluting gases.

Typically one component of a binary mixture is less soluble in the stationary phase than the other and the less soluble component will remain in the gas phase and be swept through the column at nearly the velocity of the eluting gas. The second component, however, will pass through the column at a lower rate because the process of dissolving in and expelling from the stationary liquid phase takes additional time. Because of differences in partition, the first and second components emerge from the column in the eluting gas at different times and thus are separated for detection.

Several types of detectors have heretofore been proposed and tried for sensing the presence of the component in the eluting gas and it is with respect to such detectors that this invention is directed. More particularly it is of interest to continuously measure trace amounts of total combustibles in the eluting gas stream. It will be apparent that for a detector to be useful in this type of system, the response of the detector to change in composition of the gas stream must be rapid. However, it is also desired that the detector be substantially insensitive to flow rate.

In current apparatus using the principles of gas chromatography for the analyses of hydrocarbons, very sensitive detectors are necessary to record the changes in hydrocarbon concentration in the effluent gas. Gas density balance has been used for such operations but the more common detector is the thermal conductivity cell.

It is therefore an important object of my invention to provide a detector suitable for use in the continuous measurement of trace amounts of total combustibles. A further object of the invention is to provide a combustibles detector which is suited for use in gas chromatography. It is also an object of the invention to provide a detector having a sensitivity to trace amounts of hydrocarbons which is much greater than the conventional thermal conductivity cell. A further object of the invention is to provide such a detector which is of simple and relatively inexpensive construction and is foolproof in operation. These and other objects of the invention will become apparent as the description thereof proceeds.

The present apparatus relates to a detection means of greater sensitivity and convenience than either the gas density balance or the thermal conductivity cell. Briefly, it comprises using a sweep or eluting gas containing oxygen and of measuring the hydrocarbons by catalytically oxidizing them on an electrically heated platinum wire. The combustion heats the wire changing its resistance and this change may then be detected by a Wheatstone bridge circuit. Thermal conductivity effects are eliminated by employing an electrically identical bridge reference filament in the gas stream which is rendered catalytically inactive, e.g. by pre-treatment with silicone vapors. These wires respond similarly to changes in the thermal conductivity of the surrounding gas and maintain a steady bridge zero during such changes. The detector is therefore well suited for use in situations where the thermal conductivity of the gas changes as well as the percent combustibles.

Further details and advantages of my improved system will be described by reference to the accompanying drawings wherein:

Figure 1 is a schematic view of a chromatography apparatus embodying my detector;

Figure 2 is an elevation in section of the detector;

Figure 3 is a section taken along the line 3—3 in Figure 2;

Figure 4 is an end view of the detector in Figures 2 and 3; and

Figure 5 is a diagrammatic showing of an electrical bridge circuit including the detector illustrated in Figures 2 to 4 inclusive.

Referring to Figure 1, the sweep gas containing oxygen is supplied by valved line 10 to the column 11 which is packed with Celite and with tri-isobutylene as the stationary liquid phase. The column is heated and the sweep gas, together with the trace amounts of combustibles, flows by line 12 to the detector 13, the spent gases being vented therefrom by line 14. The flow rates vary in such a system but my detector responds rapidly even at high flow rates of the order of 2000 cc./min. without undue zero noise.

Referring to Figures 2, 3 and 4 the gases from line 12 enter the block 15, pass through cylindrical screen 16 disposed within the transverse bores 17 and 17a and leave the block 15 by line 14. Transverse to the axes of the bores 17 and 17a is a broad channel 18 within which the catalytic and non-catalytic filaments 19 and 20, respectively, are disposed. The leads 21 and 22 to filament 19 and the leads 23 and 24 to the filament 20 are insulated and pass through insulating end plates 25 and 26. The filaments 19 and 20 are supported as cantilevers by the electrodes 20a and 20b and 19a and 19b supported by electrically insulating end plates 25 and 26.

The reference wire 20 is rendered incapable of catalytically oxidizing the hydrocarbons by any suitable means. Pre-treatment with silicone vapors according to the procedure described in the literature (J. Chem. Physics 16, 237 (1948)) yields a wire catalytically inactive which has proven to be of long life. Another method of deactivating the platinum reference 20 is to pre-treat it with silver solder flux at an elevated temperature and such deactivation is also permanent.

Figure 5 shows a Wheatstone bridge circuit with standard resistances 27 and 28. The catalytic wire filament 19 and the non-catalytic identical filament 20, together with a constant voltage supply 29, a zero adjusting means 30, and an output voltage indicating means such as galvanometer 31. This general type of bridge circuit and its operation are well known and will not be described in further detail.

The apparatus and system described has been used to detect hydrocarbons by catalytic combustion and the results have been compared with those using a conventional thermal conductivity cell of good quality. The system in accordance with my invention was found to be more sensitive by a factor of 10 to 15 as compared to the results with the thermal conductivity cell.

The comparison was with a diffusion type thermal conductivity cell and was on the basis of ability of each apparatus to respond to sudden concentration increase in hydrocarbons in an air stream. For a deflection of 0.4 mv. bridge unbalance the diffusion type detector required 6 cc. isooctane as compared to 0.4 cc. with this device.

My improved detector can find use in nearly every laboratory which employs vapor phase or gas chromatography and from the above it will be apparent that I have attained the objects of my invention. However, it is contemplated that modifications and variations can be made in the apparatus and in the mode of using it by those skilled in the art in light of my description without departing from the spirit of the invention. In a system deficient in oxygen and rich in combustible, detectors of this sort may be used to determine small quantities of oxygen. In the gas chromatograph case this could be applied by using a stream of hydrogen as the carrier gas. Therefore, although the invention has been described with reference to a preferred embodiment, this is by way of illustration only.

What I claim is:

1. Apparatus for effecting rapid and efficient analyses of complex gasiform mixtures containing trace amounts of combustible hydrocarbons which comprises in combination elution-partition column means, conduit means for introducing an oxygen-containing eluting gas into said column means, and detector means through which said column means discharges, said detector means including a metal block having a first relatively large cavity, a bore in said block having its axis arranged transverse to said first cavity, a first catalytic detection element in said first cavity remote from said bore, a second non-catalytic reference element in another portion of said first cavity, said catalytic and non-catalytic elements being connected with a pair of resistances in an electrical bridge circuit, and gas pervious diffusion screen means arranged within said bore and extending through said first cavity between the said elements.

2. In a gas analyzer a catalytic oxidation cell having mounted therein catalytic and non-catalytic elements, each element comprising a leg of an electrical bridge circuit, said cell including a relatively flat cavity within a test block, said elements being mounted within said cavity in remote portions thereof, a bore through said block arranged transverse to said cavity and symmetrically with respect to said elements, and a cylindrical gas pervious screen means within said bore extending substantially the entire length of said bore and through said cavity between the said elements.

3. A detector for use in gas chromatographic analysis which comprises a matched pair of electrical resistance elements, one of said elements being catalytically active for the oxidation of hydrocarbons and the other of said elements being non-catalytic with respect to such oxidation, a test cell containing said elements, said cell comprising a cavity having a width and length which is substantially greater than the depth thereof, said elements being disposed in relatively spaced portions of said cavity, a sample flow passageway arranged transverse to the said cavity and between the said elements, said passageway being of relatively small flow area with respect to the width and length of said cavity, a gas pervious sleeve in said passageway, said sleeve extending through said cavity, an electrical circuit including said resistance elements, an indicator in said circuit, said indicator indicating changes in the ratio of said catalytic and non-catalytic resistance which result from the heating of the catalytic resistance element due to catalytic oxidation of hydrocarbons thereon.

4. The apparatus of claim 1 wherein said first cavity comprises a rectangular open-ended channel in said metal block, the ends of the channel being closed by removable plates, and said first and second elements being supported symmetrically about said bore in said channel.

5. A detector for use in gas chromatographic analysis which comprises a block housing, a first relatively large cavity extending through said housing, a bore in said housing extending through said first cavity, diffusion screen means arranged within said bore and transverse to said first cavity, a pair of detection elements in said first cavity separated from each other by said diffusion screen, one of said detection elements being catalytic and the other being non-catalytic, and an electrical bridge circuit including said detection elements in adjacent arms thereof.

References Cited in the file of this patent

UNITED STATES PATENTS 1,957,341    Holt _____ May 1, 1934
2,652,315    McEvoy _____ Sept. 15, 1953

OTHER REFERENCES

Lotz et al.: "J. of Chem. Ed.," 33, 485–489 (1956).